US009712054B2

(12) United States Patent
Shroff et al.

(10) Patent No.: US 9,712,054 B2
(45) Date of Patent: Jul. 18, 2017

(54) VOLTAGE AND CURRENT LIMITS FOR ELECTRONIC DEVICE BASED ON TEMPERATURE RANGE

(71) Applicant: Freescale Semiconductor, Inc., Austin, TX (US)

(72) Inventors: Mehul D. Shroff, Austin, TX (US); Xavier Hours, Tournefeuille (FR)

(73) Assignee: NXP USA, INC., Austin, TX (US)

( * ) Notice: Subject to any disclaimer, the term of this patent is extended or adjusted under 35 U.S.C. 154(b) by 313 days.

(21) Appl. No.: 14/525,342

(22) Filed: Oct. 28, 2014

(65) Prior Publication Data

US 2015/0363533 A1 Dec. 17, 2015

(30) Foreign Application Priority Data

Jun. 13, 2014 (WO) .................. PCT/IB2014/001344

(51) Int. Cl.
| | | |
|---|---|---|
| G06F 17/50 | (2006.01) | |
| H02M 3/158 | (2006.01) | |
| G05F 3/08 | (2006.01) | |
| H02M 3/156 | (2006.01) | |

(52) U.S. Cl.
CPC ............. *H02M 3/158* (2013.01); *G05F 3/08* (2013.01); *G06F 17/5072* (2013.01); *G06F 17/5036* (2013.01); *G06F 2217/78* (2013.01); *H02M 2003/1566* (2013.01)

(58) Field of Classification Search
CPC . G05F 3/08; H02M 2003/1566; H02M 3/158; G06F 17/5036; G06F 17/5072; G06F 2217/78
See application file for complete search history.

(56) References Cited

U.S. PATENT DOCUMENTS

| | | |
|---|---|---|
| 7,292,968 B2 | 11/2007 | Wu et al. |
| 7,567,891 B1 | 7/2009 | Liu et al. |
| 7,835,890 B2 | 11/2010 | Wu et al. |
| 8,099,269 B2 | 1/2012 | Topaloglu et al. |
| 8,756,559 B2 | 6/2014 | Shroff et al. |
| 2009/0019411 A1* | 1/2009 | Chandra ............. G06F 17/5009 716/119 |

(Continued)

OTHER PUBLICATIONS

U.S. Appl. No. 14/398,901, filed Nov. 4, 2014.

(Continued)

*Primary Examiner* — Vuthe Siek (57) ABSTRACT

A design verification system simulates operation of an electronic device to identify one or more power characteristic vs. temperature (PC-T) curves for the electronic device. Each of the one or more PC-T curves indicates, for a particular reliability characteristic limit, a range of power characteristic values over a corresponding range of temperatures that are not expected to result in the reliability characteristic limit being exceeded. Based on the one or more PC-T curves, the design verification system sets a range of power characteristic limits, over a corresponding range of temperatures, for the electronic device. During operation, the electronic device employs a temperature sensor to measure an ambient or device temperature, and sets its power characteristic (voltage or current) according to the measured temperature and the power characteristic limits.

13 Claims, 4 Drawing Sheets

(56) References Cited

U.S. PATENT DOCUMENTS

| | | |
|---|---|---|
| 2011/0313735 A1 | 12/2011 | Lo et al. |
| 2012/0303303 A1* | 11/2012 | Mittl ............... G06F 19/00 702/65 |
| 2014/0181780 A1* | 6/2014 | Burd ............... G06F 17/5036 716/136 |
| 2014/0380258 A1 | 12/2014 | Hours et al. |
| 2014/0380261 A1* | 12/2014 | Bickford ............ G06F 17/5009 716/136 |
| 2015/0326216 A1* | 11/2015 | Machnicki ............ H03K 17/14 307/117 |

OTHER PUBLICATIONS

PCT Patent Application No. PCT/IB2013/002405, filed Sep. 5, 2013.
Aaron Symko, "Detecting and Managing Device Reliability in Block-level and Chip-level Simulations", Presented at Cadence Designer Network (CDN) Live, 2007, 18 pages.
Udo Sobe et al., "Robust Analog Design for Automotive Applications by Design Centering With Safe Operating Areas", IEEE Transactions on Semiconductor Manufacturing, vol. 22, No. 2, May 2009, 8 pages.
Wei-Si Jiang, "An Effective EM/IR-drop Flow with UltraSim and VAVO/VAEO", CDNLive Silicon Valley 2007, 2007, 13 pages.
Udo Sobe et al., "Verification of Safe Operating Area (SOA) Constraints in Analog Circuits", GMM/GI/ITG-Fachtagung Zuverlässigkeit and Entwurf, 2008, 6 pages.
MEDEA+, "2T204: End-of-life investigations for automotive systems (ELIAS)", 2 pages.
Zhihong Liu et al., "Design Tools for Reliability Analysis", Design Automation Conference, 2006 43rd ACM/IEEE, 2006, 6 pages.
T. Pompl et al., "Practical Aspects of Reliability Analysis for IC Designs", Design Automation Conference, 2006 43rd ACM/IEEE, 2006, 6 pages.
E. Seebacher et al., "180nm High Voltage CMOS smart power technology", MOS-AK Rome 2010, 7 pages.
Yan Liu et al., "A Simulation-Based Strategy used in Electrical Design for Reliability", 10th Int'l Symposium on Quality Electronic Design, Mar. 16, 2009, 5 pages.
Aaron Symko, "Detection and Management of Device Breakdowns in Chip Level Simulation", Presented at Cadence Designer Network (CDN) Live, Nov. 10, 2009, 33 pages.
Alevtina Podgaynaya, "Enhancement of the Electrical Safe Operating Area of Integrated DMOS Transistors With Respect to High-Energy Short Duration Pulses", IEEE Transactions on Electronic Devices, vol. 57, No. 11, Nov. 2010, 6 pages.

* cited by examiner

VOLTAGE AND CURRENT LIMITS FOR ELECTRONIC DEVICE BASED ON TEMPERATURE RANGE

BACKGROUND

Field of the Disclosure

The present disclosure relates generally to electronic devices and more particularly to voltage and current limits for electronic devices.

Description of the Related Art

A typical design flow for an electronic device includes design verification, wherein the operation of the electronic device are simulated to generate a set of operating characteristics and the operating characteristics are compared to a device specification to determine whether a design of the electronic device is predicted to operate properly. One characteristic that is sometimes examined during verification is referred to as a safe operating area (SOA) of the electronic device. The SOA identifies, for a specified maximum temperature, corresponding voltage or current conditions over which the electronic device can operate without exceeding a specified level of damage to the electronic device. The resulting voltage or current conditions are employed as limits to the supply voltage or current for the electronic device, thereby maintaining operation of the electronic device within specified limits and protecting a lifespan of the electronic device. The specified maximum temperature is typically set to an expected maximum temperature of the electronic device under the most extreme expected operating conditions. This can result in the voltage or current conditions being set at a level that unnecessarily reduces overall performance of the electronic device.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION OF EMBODIMENT(S)

FIGS. 1-4 illustrate techniques for setting a range of limits on voltage or current conditions for an electronic device based on a corresponding range of temperatures. In at least one embodiment, a design verification system simulates operation of the electronic device to identify one or more power characteristic vs. temperature (PC-T) curves for the electronic device. Each of the one or more PC-T curves indicates, for a particular reliability characteristic limit, a range of power characteristic values over a corresponding range of temperatures that are not expected to result in a reliability characteristic limit being exceeded. Based on the one or more PC-T curves, the design verification system sets a range of power characteristic limits over a corresponding range of temperatures for the electronic device. During operation, the electronic device employs a temperature sensor to measure an ambient temperature or device temperature, and sets its power characteristic (voltage or current) according to the measured temperature and the power characteristic limits. The electronic device can thereby increase its performance at lower temperatures without exceeding the reliability characteristic limit, thereby improving overall device performance.

To illustrate via an example, the design verification system may simulate operation of an electronic device to ensure it does not exceed a specified limit on the gate oxide (GOX) time-dependent dielectric breakdown (TDDB) reliability characteristic. Conventionally, a design verification system would identify a safe operating area by determining, for a specified maximum temperature (TMAX), a corresponding power characteristic limit (PCMAX) which would result in the GOX TDDB limit not being exceeded. However, the TMAX value may be set for a particularly extreme set of operating conditions which the electronic device will only experience for at most small amounts of time. The PCMAX value will therefore be set to a relatively low value that hurts device performance under most operating conditions, and only protect the electronic device in relatively rare circumstances. Using the techniques described herein, the design verification system can identify a range of PC limit values for a corresponding range of temperatures that ensure the GOX TDDB limit is not exceeded. During operation, the electronic device adjusts the power characteristic, based on a measured temperature to ensure that the corresponding PC limit is not exceeded. At temperatures lower than TMAX, this can improve device performance while still ensuring that the GOX TDDB limit is not exceeded.

For example, PCMAX may be 1.2 volts at a specified TMAX of 150 degrees Celsius. However, the design verification system can determine that, at a temperature of 75 degrees Celsius, the PC limit can be set to 1.3 volts without the GOX TDDB limit being exceeded. Accordingly, during operation of the electronic device, in response to measuring an ambient temperature at or below 75 degrees Celsius, the electronic device can set its power voltage to at or about 1.3 volts. This increase in voltage can increase performance without exceeding the GOX TDDB limit. In contrast, a conventional device would maintain the power voltage at or below 1.2 volts, even at temperatures at or below 75 degrees Celsius, to ensure that the PCMAX value is not exceeded, thus hurting device performance.

As used herein, a power characteristic refers to a voltage or current supplied to at least one module of an electronic device. An example of a power characteristic is a supply voltage (frequently referred to as VDD) used to provide a voltage reference for one or more circuits of the electronic device. A reliability characteristic refers to a characteristic of an electronic device that indicates an amount of damage expected to occur at the electronic device for a given condition and given unit of time. Examples of reliability characteristics including characteristics such as GOX TDDB, back-end-of-line (BEOL) TDDB, local oxidization of silicon (LOCOS), a shallow trench isolation (STI) breakdown, electromigration (EM), aging characteristics such as hot carrier injection (HCI) aging, bias temperature instability (BTI) aging, and the like.

Figure 1:
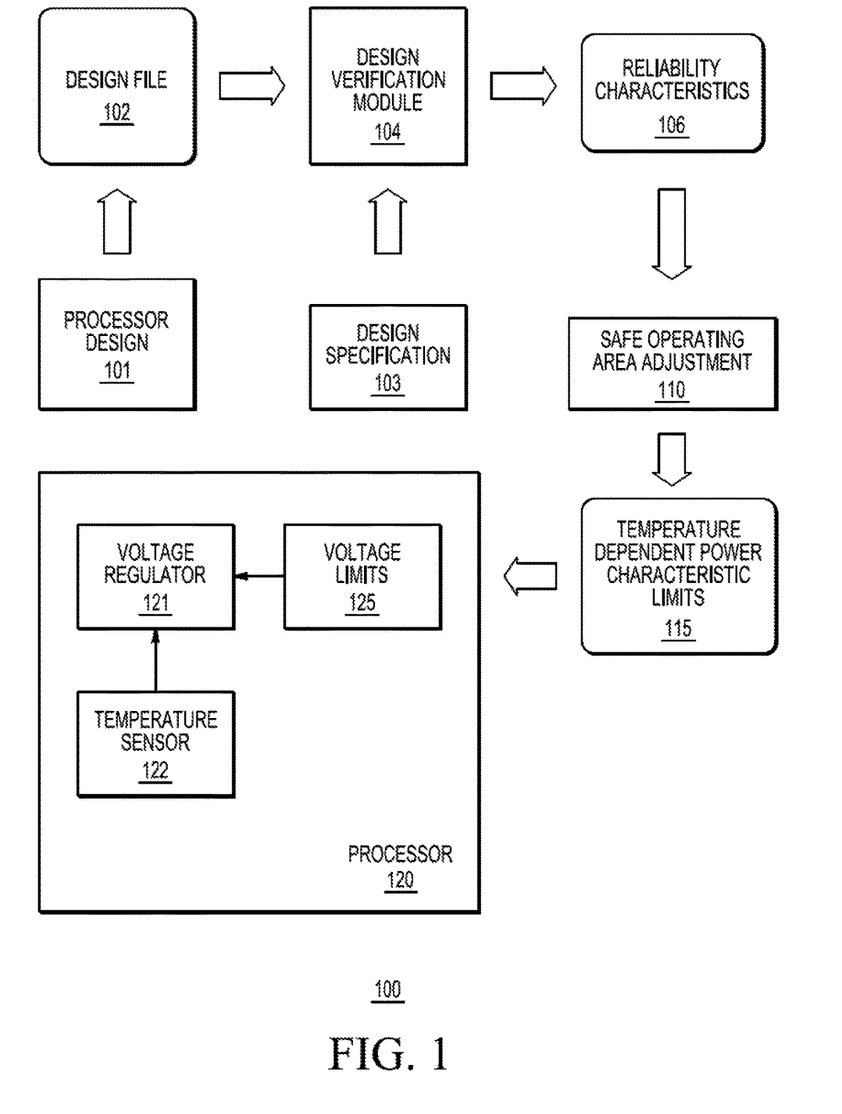
FIG. 1 is a block diagram of a design verification system to set power limits for an electronic device for a range of temperatures in accordance with at least one embodiment of the present disclosure.

FIG. 1 illustrates a design verification system 100 in accordance with at least one embodiment of the present disclosure. In at least one embodiment, the design verification system 100 is implemented at a computer system, such as a desktop computer, workstation, server, or combination thereof. Alternatively, some or all of the described functionality can be implemented in hardware logic. Further, the individual modules of the design verification system 100 described below can reflect individual or collective software programs, hardware devices, or combinations thereof. Further, although illustrated and described individually, each of the modules described below can represent a portion of a larger software program, hardware device, or combination thereof.

The design verification system 100 is generally configured to simulate one or more aspects of an electronic device design. For purposes of description, the design verification system 100 is described with respect to simulating operation of a processor 120 based on a processor design 101. However, it will be appreciated that the techniques disclosed herein can be applied to any of a variety of electronic device designs, including integrated circuit designs, system-on-a-chip designs, consumer electronic device designs, and the like.

The processor design 101 reflects the modules the processor 120, or portions thereof, the behavior of those modules, and the relationships between the modules and their behaviors. The processor design 101 can be a data file, a written set of device specifications, a conceptual framework for processor, or a combination thereof. In at least one embodiment, the processor design 101 is instantiated as a design file 102 that embodies a description of features of a processor, or the interpretation of processor features by a designer. In at least one embodiment, the design file 102 is set forth in a machine interpretable data file, such as a hardware description language (HDL) file in compliance with the Verilog™ hardware description language, that describes the modules, behaviors, and relationships reflected in the processor design 101 in a format that can be interpreted by one or more computer aided design tools.

The design verification system 100 includes a design verification module 104 that is generally configured to simulate operation of the processor 120, based on the design file 102 and a design specification 103, to identify reliability characteristics 106. The design specification 103 can set forth specified information about the expected operation and operating conditions for the processor 120, such as an expected ambient or device temperature range under which the processor 120 is expected to operate, and reliability characteristic limits that are not to be exceeded for the processor design 101 to pass verification. The design specification 103 can also indicate other information, such as the process technology to be used to form the processor 120, specified maximum power characteristics for one or more modules of the processor 120, and the like. Based on the design specification 103 and the design file 102, the design verification module 104 simulates the operation of the processor 120 for a given set of input stimuli (not shown) and measures predicted characteristics of the processor 120, such as signal timing information, signal voltage or current levels, device temperatures, and the like.

Based on these measured characteristics, the design verification module 104 generates the reliability characteristics 106. In at least one embodiment, the reliability characteristics are generated as one or more PC vs. T curves, as described further below in the examples of FIG. 2. Each PC-T curve indicates, for a corresponding reliability characteristic, a set of temperature values under which the processor 120 can potentially operate, and a corresponding set of PC values that are expected to keep the reliability characteristic below the corresponding reliability characteristic limit. Thus, for example, for the reliability characteristic BEOL TDDB, the design verification module 104 can generate a voltage vs. temperature curve that indicates a range of temperatures and corresponding voltages, wherein each voltages is set so as to keep the BEOL TDDB for the processor 120 below the reliability threshold (as specified at the design specification 103) when the processor 120 operates at the corresponding temperature.

The design verification system 100 includes a safe operating area adjustment module 110 generally configured to generate a set of temperature dependent PC limits 115 based on the reliability characteristics 106. In at least one embodiment, the safe operating area adjustment module 110 determines, for each of a range of temperatures (as specified by the design specification 103, the minimum power characteristic indicated over each PC-T curve stored at the reliability characteristics 106. This ensures that, at each temperature, the temperature dependent PC limits 115 will not cause the reliability characteristic limit to be exceeded. For example, in a particular embodiment the reliability characteristics 106 and corresponding temperature dependent PC limits are indicated by the following table:

| Temperature | Voltage (BEOL TDDB) | Voltage (GOX TDDB) | Temperature Dependent PC Limit |
| --- | --- | --- | --- |
| T1 | 0.92 V | 0.90 V | 0.90 V |
| T2 | 0.95 V | 0.92 V | 0.92 V |
| T3 | 1.0 V | 0.98 V | 0.98 V |
| T4 | 1.1 V | 1.2 V | 1.1 V |

Thus, as indicated by the first row of the above table, the reliability characteristics 106 indicate that, at the temperature T1, a supply voltage of 0.92 V will ensure that a TDDB limit for the processor 120 will not be exceeded based on BEOL TDDB and a supply voltage of 0.90 V will ensure that the TDDB limit will not be exceeded based on GOX TDDB. Accordingly the safe operating area adjustment module 110 sets the temperature dependent PC limit for temperature T1 to 0.90 volts to ensure that the TDDB limit will not be exceeded by either of BEOL TDDB or GOX TDDB. The fourth row indicates that, at the temperature T4, a supply voltage of 1.1 V will ensure that a TDDB limit for the processor 120 will not be exceeded based on BEOL TDDB and a supply voltage of 1.2 V will ensure that the TDDB limit will not be exceeded based on GOX TDDB. Accordingly the safe operating area adjustment module 110 sets the temperature dependent PC limit for temperature T4 to 1.1 volts to ensure that the TDDB limit will not be exceeded by either of BEOL TDDB or GOX TDDB.

In the above example embodiment, the design verification module 104 generates the reliability characteristics 106 such that the PC-T curves ensure that one or more reliability characteristic limits is not exceeded. In at least one other embodiment, the design verification module identifies a level of aging based on a maximum temperature (TMAX) specified by the design specification 103. The design verification module 104 identifies and stores, for each temperature in a range specified by the design specification 103, the corresponding PC that will cause an equivalent amount of aging. The result is a temperature vs PC curve stored at the reliability characteristics 106. The safe operating area adjustment module 110 then identifies, for each temperature, whether the voltage indicated by the reliability characteristics 106 exceeds a reliability characteristic limit at that temperature and, if so, lowers the PC until the reliability characteristic at that temperature is not exceeded. The safe operating area adjustment module 110 stores the resulting temperature and corresponding PC values at the temperature dependent PC limits 115. An example is illustrated by the following table:

| Temperature | Vmax@Tmax | BEOL TDDB Voltage Limit | GOX TDDB Voltage limit | Temperature Dependent PC Limit |
|---|---|---|---|---|
| T1 | 0.3 V | 0.5 V | 0.6 V | 0.3 V |
| T2 | 0.4 V | 0.5 V | 0.7 V | 0.4 V |
| T3 | 0.7 V | 0.6 V | 0.8 V | 0.6 V |
| T4 | 1.1 V | 1.0 | 0.9 V | 0.9 V |

Thus, as indicated by the first row of the table above, the reliability characteristics 106 indicate that, at the temperature T1, a supply voltage of 0.3 V is expected to cause the same BTI/HCl damage that occurs at TMAX. Because the voltage limits for both BEOL TDDB and GOX TDDB are above that voltage, the safe operating area adjustment module 110 sets the temperature dependent PC limit at temperature T1 to 0.3 volts. Row 4 of the table indicates that, at the temperature T4, a supply voltage of 1.1 V is expected to cause the same BTI/HCl damage that occurs at TMAX. However, this supply voltage is above the specified limits for both BEOL TDDB and GOX TDDB. Accordingly the safe operating area adjustment module 110 iteratively adjusts voltage until both the BEOL TDDB and GOX TDDB limits are satisfied, and stores the resulting voltage of 0.9 volts as the temperature dependent PC limit for temperature T4 to 0.6 volts. In at least one embodiment, the safe operating area adjustment module 110 may add additional margin to one or more of the identified PC values to ensure that process, voltage, temperature, or other variations at the processor 120 do not cause any of the reliability characteristic limits to be exceeded. In at least one embodiment, the voltage is set such that it is below the TDDB limits, but above the level of BTI/HCl damage corresponding to TMAX. The design may be adjusted in other ways (e.g., changing of gate size on one or more transistors) or otherwise margined to ensure the HCl/BTI damage limit is not exceeded.

In at least one embodiment, the PC limits 115 are used to configure (e.g. modify) the processor design 101 so that the processor 120 is formed to operate within the PC limits 115. For example, in at least one embodiment the processor 120 is fabricated as a physical integrated circuit device subsequent to verification of the processor design 101, including generation of the temperature dependent PC limits 115. The processor 120 is formed to include a voltage regulator 121, a temperature sensor 122, and a storage module (not explicitly depicted) to store a set of voltage limits 125 that reflect the temperature dependent PC limits 115. In operation, the voltage regulator 121 provides an adjustable supply voltage to one or more modules (not shown) of the processor 120. The temperature sensor 122 senses a temperature, such as a surface or device temperature of the processor 120, or an ambient temperature of the air or other medium surrounding the processor 120. The voltage regulator 121 identifies the one of the voltage limits 125 corresponding to the measured temperature, and adjusts its provided supply voltage to ensure that the voltage limit is not exceeded. The voltage regulator 121 thus ensures that the temperature dependent PC limits 115 are enforced. Further, because those limits at relatively low temperatures are typically higher than a single PC limit based on a specified maximum temperature, the voltage regulator can increase the supply voltage at lower temperatures, thereby improving device performance without exceeding the reliability characteristic limits of the design specification 103.

Figure 2:
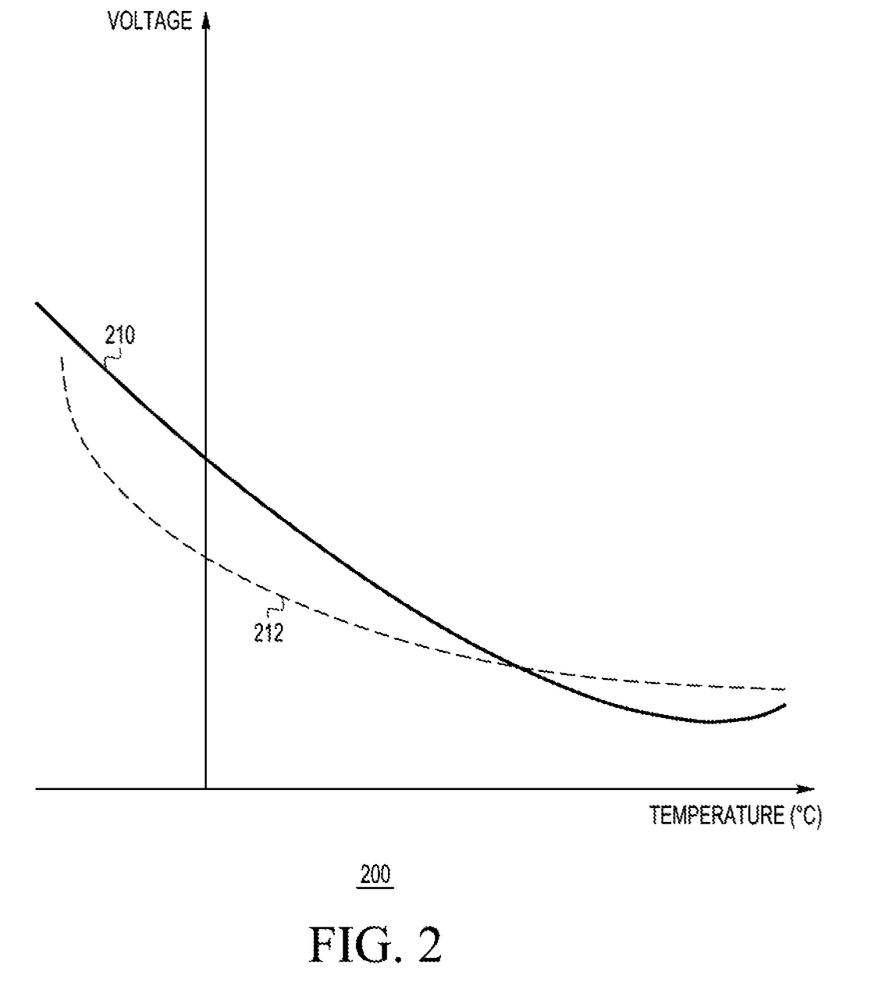
FIG. 2 is a diagram illustrating examples of voltage-temperature curves used to set power limits at the design verification system of FIG. 1 in accordance with at least one embodiment of the present disclosure.

FIG. 2 illustrates a diagram 200 showing voltage vs. temperature (V-T) curve 210 and a V-T curve 212. Each V-T curve is associated with a different reliability characteristic. For purposes of description it is assumed that V-T curve 210 is associated with BEOL TDDB and the V-T curve is associated with GOX TDDB. Further, although the V-T curves 210 and 212 can be depicted as continuous curves, in at least one embodiment each of the curves 210 and 212 are composed of discrete points. Further, although the V-T curves 210 and 212 are illustrated in pictorial fashion, in at least one embodiment another PC-T curve can be stored as a set of paired PC and temperature values indicating each point of the curve, or otherwise stored in a fashion indicating a relationship between a temperature range and a corresponding range of PC values.

Each of the V-T curves 210 and 212 can be generated by based on reliability testing results and models. In at least one embodiment, the V-T curve 210 is generated by selecting a temperature value of a range of temperature values specified at the design specification 103 and determining, using conventional techniques for determining BEOL TDDB, a corresponding voltage value. In at least one embodiment, an individual V-T curve is generated for each of a set of specified semiconductor device layers (indicated by the design specification 103) to be used to form the processor 120 and can generate the V-T curve 210 by selecting the minimum voltage among the individual layer curves. In the case of an FEOL TDDB curve, individual V-T curves are generated for each of a specified set of devices to be used at the processor 120, and the final the V-T curve 210 is generated by selecting the minimum voltage among the individual device curves.

The V-T curve 212 is generated based on reliability testing results by selecting a temperature value of a range of temperature values specified at the design specification 103 and determining a corresponding voltage value using conventional techniques for determining GOX TDDB. The V-T curves 210 and 212 can be stored for access as a look-up table that indicates the coordinates of each point of the curve, as a function that defines the curve, and the like.

Figure 3:
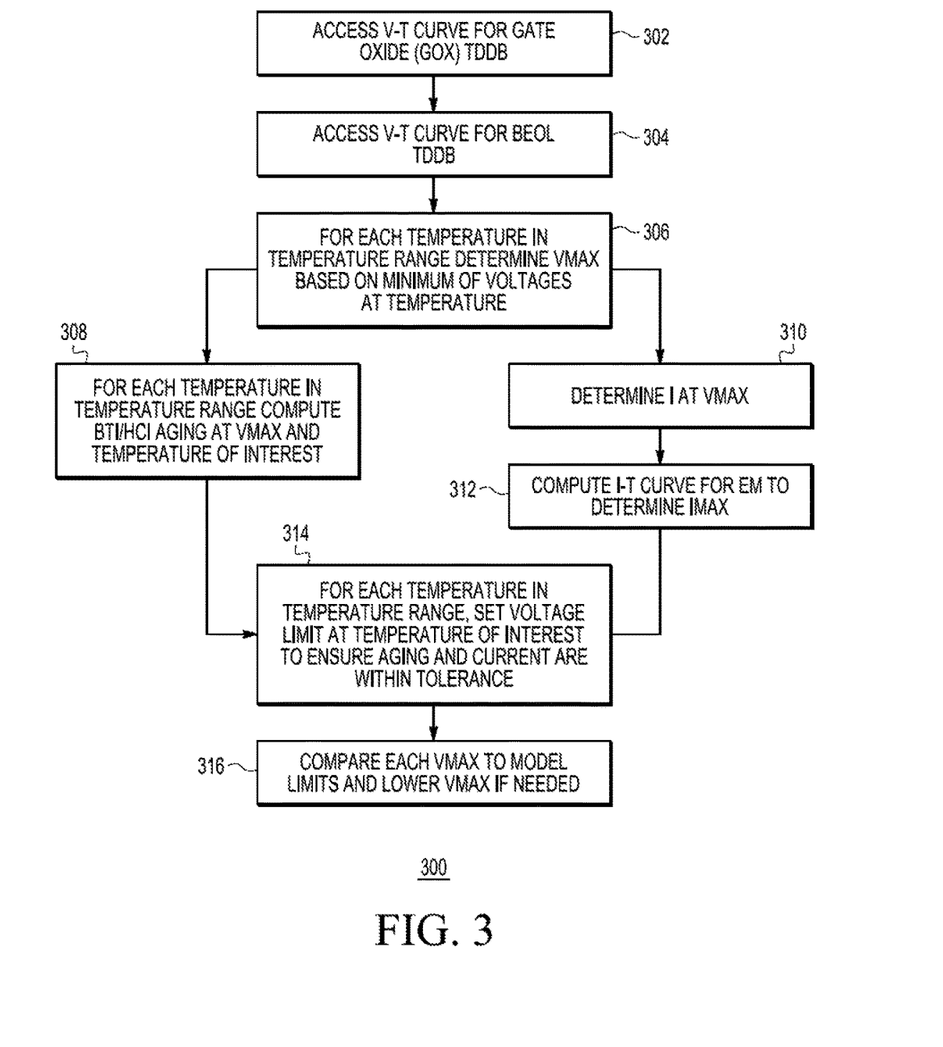
FIG. 3 is a flow diagram of a method of setting power limits for an electronic device for a range of temperatures based on time-dependent dielectric breakdown in accordance with at least one embodiment of the present disclosure.

FIG. 3 illustrates a flow diagram of a method 300 of setting power limits for an electronic device for a range of temperatures based on TDDB in accordance with at least one embodiment of the present disclosure. For purposes of description, the method 300 is described with respect to an example implementation at the design verification system 100 of FIG. 1 in accordance with at least one embodiment of the present disclosure, but it will be appreciated that in other embodiments the method 300 can be implemented at other systems and devices.

At block 302 the design verification module 104 accesses a voltage vs. temperature (V-T) curve for GOX TDDB for the processor design 101 for a range of temperatures specified at the design specification 103. At block 304 the design verification module 104 accesses a V-T curve over the specified range of temperatures for BEOL TDDB for the processor design 101. In at least one embodiment, the design verification module accesses the V-T curves in a different order or in parallel. At block 306, for each temperature in the temperature range the safe operating area adjustment module 110 identifies a corresponding voltage value, designated "VMAX", by identifying the minimum voltage between the BEOL TDDB curve and the GOX TDDB curve at the temperature.

At block 308, the safe operating area adjustment module 110 computes, for each temperature in the temperature range, a BTI/HCl aging value based on the corresponding VMAX value. At block 310 the safe operating area adjustment module 110 identifies, for each temperature in the temperature range, a current value (designated "I") for the corresponding VMAX value. At block 312 the design verification module 104 accesses a current vs temperature (I-T) curve for EM for the processor design 101 over the temperature range which has been identified using conventional electromigration (EM) calculation techniques. The I-T curve will indicate a maximum current value, designated "IMAX." The IMAX value corresponds to a reliability characteristic limit that is not to be exceeded in order to keep EM damage of the processor 120 within specified limits. In at least one embodiment, the design verification module 104 accesses two I-T curves to identify IMAX: an I-T curve calculated based on direct current (DC current) and an I-T curve calculated based on root mean square (RMS) current. The design verification module 104 identifies the IMAX for each temperature by identifying the minimum IMAX value at each temperature between the DC and RMS I-T curves.

At block 314 the safe operating area adjustment module 110 sets, for each temperature in the temperature range, a corresponding voltage, wherein the voltage is set so that the BTI/HCl aging value (as calculated at block 308) does not exceed a BTI/HCl aging limit specified at the design specification 103 and does not exceed the EM damage limit identified at block 312. For example, in one embodiment, the safe operating area adjustment module 110 identifies that the BTI/HCl aging value calculated at block 308 for a given VMAX exceeds the BTI/HCl aging limit. In response, the safe operating area adjustment module 110 reduces the VMAX value and recalculates the BTI/HCl aging value. The safe operating area adjustment module 110 continues to iteratively adjust the VMAX value until the BTI/HCl aging value is below the BTI/HCl aging limit.

At block 316 the safe operating area adjustment module 110 compares each VMAX value (as adjusted, if necessary, at block 406) to model limits for the processor design 101. These model limits reflect limitations in the design file 102, the design verification module 104, the design specification 103, or a combination thereof, that in turn limit the accuracy with which the behavior of the processor 120 can be predicted. If a given VMAX value exceeds the model voltage limit, safe operating area adjustment module 110 reduces the given VMAX value until the voltage limit is not exceeded. In at least one embodiment, block 314 is omitted for circuits where model accuracy is not needed.

After the VMAX values at each temperature in the specified temperature range have been adjusted, the safe operating area adjustment module 110 stores each temperature in the range, together with the corresponding VMAX value, at the temperature dependent PC limits 115. The temperature dependent PC limits 115 can subsequently be provided to the processor 120 to set voltage or current limits during operation, as described further herein.

Figure 4:
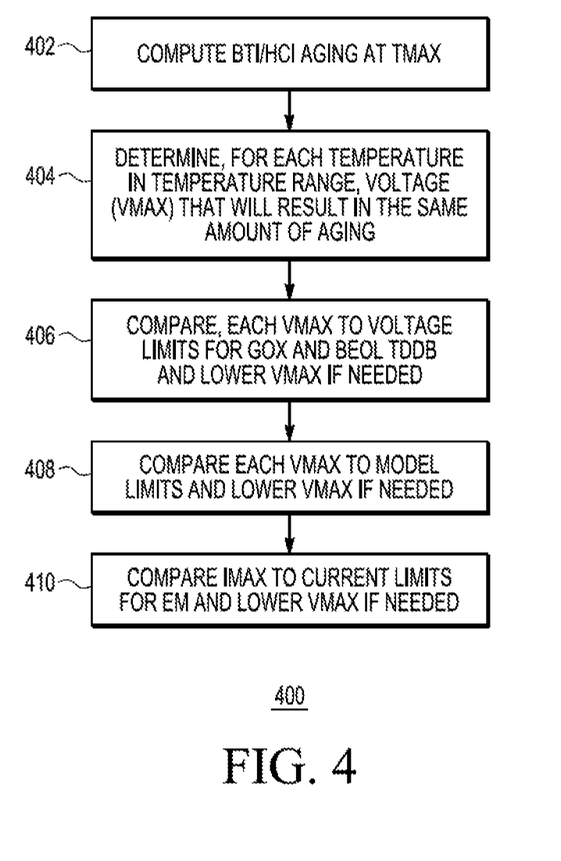
FIG. 4 is a flow diagram of a method of setting power limits for an electronic device for a range of temperatures based on predicted aging of the electronic device in accordance with at least one embodiment of the present disclosure.

FIG. 4 is a flow diagram of a method 400 of setting power limits for an electronic device for a range of temperatures based on predicted aging of the electronic device in accordance with at least one embodiment of the present disclosure. For purposes of description, the method 400 is described with respect to an example implementation at the design verification system 100 of FIG. 1 in accordance with at least one embodiment of the present disclosure, but it will be appreciated that in other embodiments the method 400 can be implemented at other systems and devices.

At block 402 the design verification module 104 identifies a maximum temperature ("TMAX") in a specified temperature range stored at the design specification 103. The design verification module 104 computes a BTI/HCl aging value based on the temperature TMAX. At block 404 the design verification module determines, for each temperature in the temperature range, a corresponding voltage (designated VMAX) that will cause the same amount of BTI/HCl aging (as indicated by the aging value calculated at block 402) as is expected to occur at the temperature TMAX. The design verification module 104 stores the resulting set of VMAX values at the reliability characteristics 106. At block 406 the safe operating area adjustment module 110 compares each VMAX value in the set to voltage limits for GOX TDDB and BEOL TDDB. These reliability characteristic limits can be specified at the design specification 103 or calculated, based on other reliability characteristic information, at the design verification module 104. If a given VMAX value exceeds the voltage limit for GOX TDDB and BEOL TDDB, the safe operating area adjustment module 110 reduces the given VMAX value until the voltage limit is not exceeded.

At block 408 the safe operating area adjustment module 110 compares each VMAX value (as adjusted, if necessary, at block 406) to model limits for the processor design 101. These model limits reflect limitations in the design file 102, the design verification module 104, the design specification 103, or a combination thereof, that in turn limit the accuracy with which the behavior of the processor 120 can be predicted. If a given VMAX value exceeds the model voltage limit, safe operating area adjustment module 110 reduces the given VMAX value until the voltage limit is not exceeded.

At block 410 the safe operating area adjustment module 110 identifies for each VMAX (as adjusted, if necessary, at one or both of block 406 and block 408) a corresponding current (IMAX) value. In at least one embodiment, the IMAX value for each temperature is identified based on the minimum value at each temperature for a DC I-T curve and an RMS I-T curve. For each IMAX value, the safe operating area adjustment module compares the IMAX value to current limits for EM for the processor design 101. If a given IMAX value exceeds the EM voltage limit, the safe operating area adjustment module 110 reduces the IMAX value and the corresponding VMAX value until the current limit is not exceeded. After the IMAX and corresponding VMAX values at each temperature in the specified temperature range have been adjusted, the safe operating area adjustment module 110 stores each temperature in the range, together with the corresponding VMAX value, at the temperature dependent PC limits 115. The temperature dependent PC limits 115 can subsequently be provided to the processor 120 to set voltage or current limits during operation, as described further herein.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A computer-implemented method comprising:
   identifying, for a range of temperatures, a corresponding range of power characteristic values based on a first reliability characteristic of an electronic device design, the identifying comprising:
      receiving a first power characteristic versus temperature curve for the first reliability characteristic;
      receiving a second power characteristic versus temperature curve for a second reliability characteristic of the electronic device design; and
      identifying, for each temperature in the range of temperatures, a corresponding power characteristic based on a minimum of a corresponding point of the first power characteristic versus temperature curve and a corresponding point of the second power characteristic versus temperature curve;
   configuring the electronic device design for the range of power characteristic values to be power characteristic limits for operation of an electronic device based on the electronic device design; and
   fabricating an integrated circuit based on the electronic device design to operate within the power characteristic limits.

2. The method of claim 1, wherein identifying the range of power characteristic values further comprises:
   identifying, for each power characteristic value of the range of power characteristic values, a predicted aging of the electronic device;
   identifying a margin based on the predicted aging; and
   identifying the range of power characteristic values based on the margin.

3. The method of claim 1, wherein the first reliability characteristic is a gate oxide time-dependent dielectric breakdown (TDDB) characteristic.

4. The method of claim 3, wherein the second reliability characteristic is a back-end-of-line (BEOL) TDDB characteristic.

5. The method of claim 3, wherein the second reliability characteristic is one of a local oxidization of silicon (LOCOS) characteristic and a shallow trench isolation (STI) breakdown characteristic.

6. The method of claim 1, wherein receiving the second power characteristic versus temperature curve comprises:
   receiving a plurality of power characteristic versus temperature curves for a plurality of semiconductor layers of the electronic device design; and
   determining the second power characteristic versus temperature curve by computing, for each temperature in the range of temperatures, a minimum power characteristic based on the plurality of power characteristic versus temperature curves.

7. The method of claim 1, further comprising:
   identifying a current based on a voltage of the range of power characteristic values;
   determining a current versus temperature curve for the range of temperatures for the electronic device design based on a third reliability characteristic of the electronic device design; and
   adjusting the range of power characteristic values based on a comparison of the current and the current versus temperature curve.

8. A non-transitory computer readable storage medium tangibly embodying instructions to manipulate at least one processor to:
   identify, for a range of temperatures, a corresponding range of power characteristic values based on a first reliability characteristic of an electronic device design, wherein the instructions to manipulate the at least one processor to identify the range of power characteristic values comprise instructions to manipulate the at least one processor to:
      access a first power characteristic versus temperature curve for the first reliability characteristic;
      access a second power characteristic versus temperature curve for a second reliability characteristic of the electronic device design; and
      identify, for each temperature in the range of temperatures, a corresponding power characteristic based on a minimum of a corresponding point of the first power characteristic versus temperature curve and a corresponding point of the second power characteristic versus temperature curve;
   provide the range of power characteristic values as power characteristic limits for operation of an electronic device based on the electronic device design; and fabricate an integrated circuit based on the electronic device design to operate within the power characteristic limits.

9. The non-transitory computer readable storage medium of claim 8, wherein the instructions to manipulate the at least one processor to identify the range of power characteristic values comprise instructions to manipulate the at least one processor to:
- identify, for each power characteristic of the corresponding range of power characteristic values, a predicted aging of the electronic device;
- identify margin based on the predicted aging; and
- identify the range of power characteristics based on the margin.

10. The non-transitory computer readable storage medium of claim 8, wherein the first reliability characteristic is a gate oxide time-dependent dielectric breakdown (TDDB) characteristic.

11. The non-transitory computer readable storage medium of claim 10, wherein the second reliability characteristic is a back-end-of-line (BEOL) TDDB characteristic.

12. The non-transitory computer readable storage medium of claim 8, wherein the instructions to manipulate the at least one processor to access the second power characteristic versus temperature curve comprise instructions to manipulate the at least one processor to:
- compute a plurality of power characteristic versus temperature curves for a plurality of layers of the electronic device design; and
- compute the second power characteristic versus temperature curve by computing, for each temperature in the range of temperatures, a minimum power characteristic based on the plurality of power characteristic versus temperature curves.

13. The non-transitory computer readable storage medium of claim 8, further comprising instructions to manipulate at least one processor to:
- identify a current based on a voltage of the range of power characteristic values;
- determine a current versus temperature curve for the range of temperatures for the electronic device design based on a third reliability characteristic; and
- adjust the range of power characteristic values based on a comparison of the current and the current versus temperature curve.

* * * * *